Dec. 15, 1959   L. J. AINSWORTH   2,917,123
STEERING DRIVE AXLE INCLUDING A RIGIDLY SECURED CARDAN JOINT
Filed Jan. 14, 1957   2 Sheets-Sheet 1
FIG_1
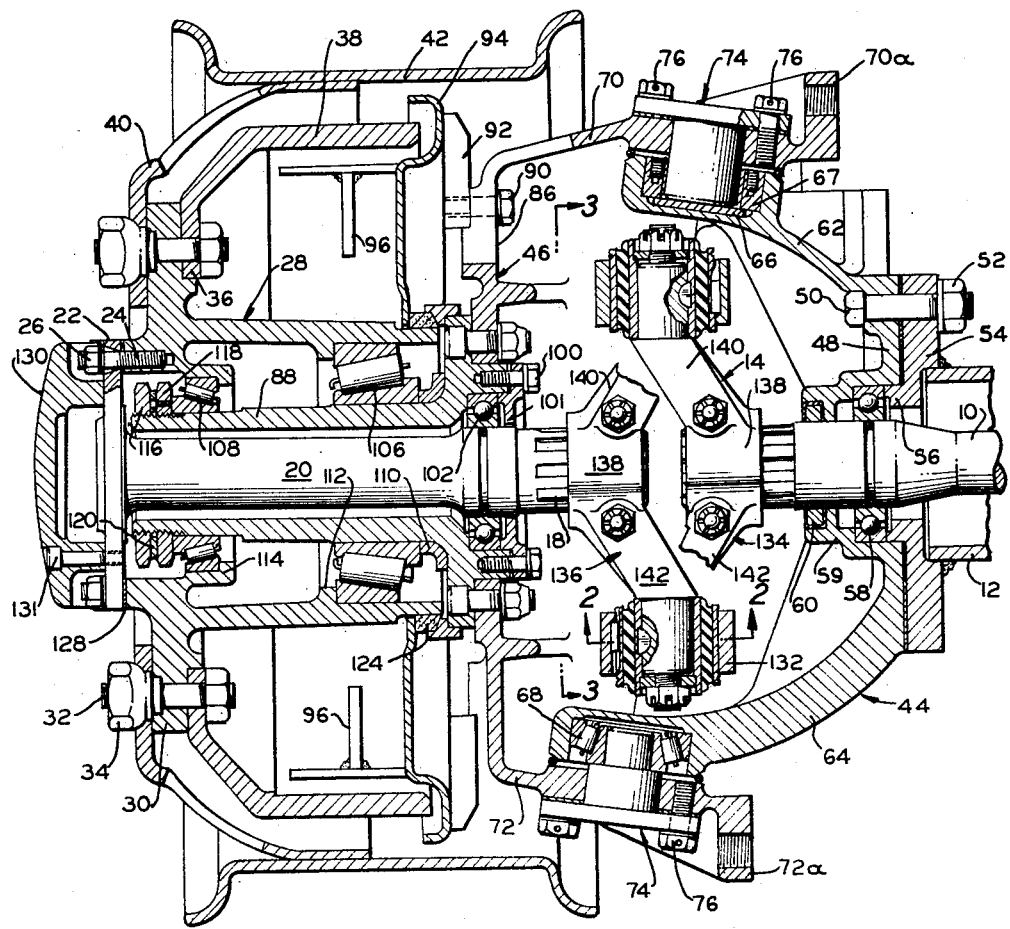
FIG_2
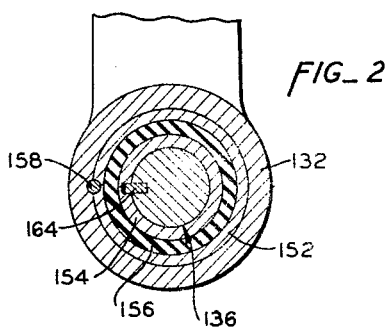
INVENTOR.
LAINE J. AINSWORTH
BY Naylor + Neal
ATTORNEYS

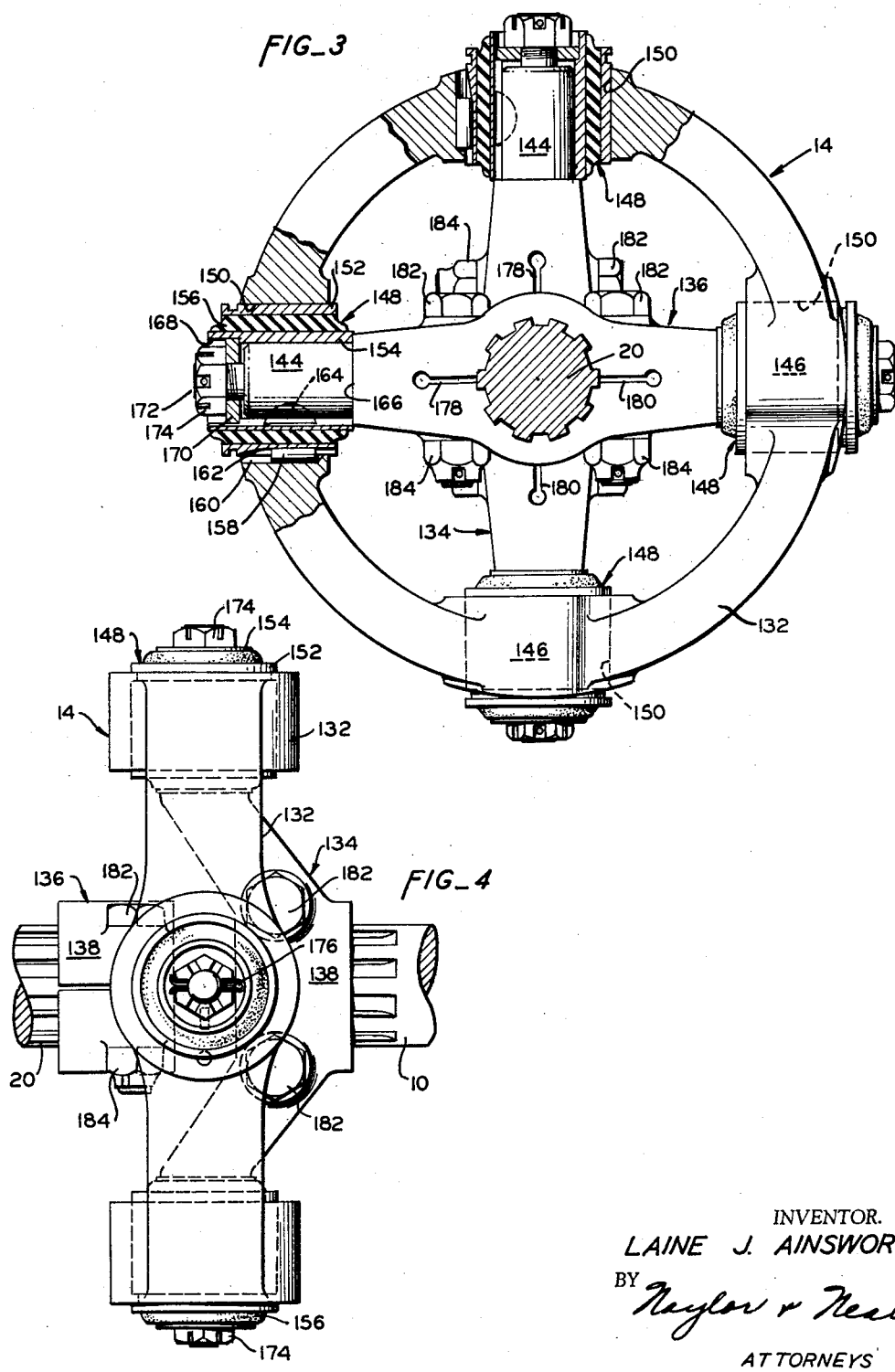

United States Patent Office 2,917,123
Patented Dec. 15, 1959

2,917,123

STEERING DRIVE AXLE INCLUDING A RIGIDLY SECURED CARDAN JOINT

Laine J. Ainsworth, Danville, Calif.

Application January 14, 1957, Serial No. 634,083

1 Claim. (Cl. 180—43)

This invention relates to steering drive axles for motor vehicles, and more particularly to improvements in such steering drive axles. The improvements forming the invention are embodied in the Cardan type universal joint which connects the inner and outer axle members of the steering drive axle assembly.

The steering drive axle assembly of the subject invention is an improved form of the axle assembly shown in my co-pending application, Serial Number 512,060, filed May 31, 1955, now Patent No. 2,871,965.

An object of this invention is to provide a Cardan joint for such an axle assembly which requires no lubrication.

Another object of the invention is to provide such a universal joint which is very efficiently adapted to take up, or absorb, those undesirable motions in such joints caused by normal manufacturing tolerances of the various parts and those motions caused by deflections of the supporting parts of the axle assembly in rugged service.

A further object of the invention is to provide such a universal joint with means to absorb shocks caused by sudden jerks imparted by the vehicle's driving and braking systems.

Still a further object of the invention is to provide such a universal joint adapted to damp the normal rotative reactions of such joints to a point where even during a full turn of the vehicle the motions imparted to the steering mechanism of the axle assembly and the spring suspension thereof are barely noticeable.

These and other objects and advantages of the invention will be apparent from the following description taken in conjunction with the drawings forming part of this specification, and in which:

Figure 1 is a view in vertical diametral section of one end of the improved steering drive axle assembly;

Figure 2 is an enlarged view in section taken along lines 2—2 of Figure 1;

Figure 3 is an enlarged view taken along lines 3—3 of Figure 1, with parts thereof being shown in section; and Figure 4 is an enlarged view in elevation of the universal joint of the steering drive axle assembly.

With reference to Figure 1, an inner axle shaft 10, disposed within axle housing 12 and having its inner end, not shown, connected by means of an involute spline to the side gear to the conventional differential, not shown, has its outer end spline-connected to one side of a Cardan type universal joint indicated generally at 14. The other side of said joint 14 is connected to the splined inner end 18 of outer axle shaft 20. Shaft 20 is provided with a driving flange 22 which is connected by studs 24 and nuts 26 to outer wheel hub 28 which has secured to radial flange 30 thereof, as by studs 32 and nuts 34, plate 36, having integral therewith brake drum 38, and web 40 serving as the carrier for rim 42 upon which a tire, not shown, is adapted to be mounted.

The non-rotatable structural support means for the rotatable elements above-mentioned comprise a suspension yoke 44 and an inner wheel hub 46 pivotally connected to yoke 44. Yoke 44 is provided with an end flange 48 which is secured, as by studs 50 and nuts 52, to a flange 54 carried at the outer end of the axle housing 12. Flange 54 is provided with an annular pilot extension 56 which fits within the flange 48 of yoke 44 and serves to retain bearing 58 within the inwardly directed annular extension 59 of flange 48 in supporting relation to the inner axle shaft 10. Also disposed within the annular extension 59 of flange 48 is a seal 60 having a wiping engagement with shaft 10.

The two arms 62 and 64 of suspension yoke 44 are provided with outwardly directed recesses within which there are disposed thrust plate 66, bushing 67 and tapered roller bearing 68. The inner wheel hub 46 is provided with suspension arms 70 and 72 which extend over the arms 62 and 64 and are pivotally secured thereto by king pin studs 74 which extend through the arms 70 and 72 and into the bushing 67 and bearing 68 and which are secured to the arms 70 and 72, as by bolts 76.

The inner wheel hub 46 is provided with a radially extending portion 86 and a spindle portion 88. Hub portion 86 has secured thereto, as by cap screws 90, a ring member 92 to which there is secured, as by welding, a brake back-up plate 94 carrying brake shoes 96 cooperatively related to a brake band carried by drum 38. Also secured to hub portion 86, as by cap screws 100, is a retainer ring 101 for a roller bearing 102 for shaft 20. Spindle portion 88 carries tapered roller bearings 106 and 108 which in turn support the outer wheel hub 28. Bearing 106 is positioned between spacer member 110 and an inwardly directed flange 112 formed on hub 28, while bearing 108 is positioned against inwardly directed flange 114 formed on hub 28 and maintained in this position by nuts 116 and 118 and lock washer 120 disposed on the threaded end of spindle portion 88.

An oil seal 124 serves to seal the rearward side of the space between the hubs 28 and 46, while a gasket 128, hub cap 130, and hub cap attaching cap screws 131 extending through the driving flange 22 of shaft 20 serve to seal the outer side of the space between hubs 28 and 46. A steering connection is adapted to be made at lugs 70a and 72a which are integral with suspension arms 70 and 72.

A steering drive axle assembly, as thus far described corresponds with that shown in my above-mentioned co-pending application. The description to this point is preliminary to a description and a pointing out of the novel features constituting the subject invention.

The universal joint, indicated generally at 14, comprises a compensating ring 132 and a pair of torque bars 134 and 136. The bars 134 and 136 are alike, with each consisting of an internally splined hub portion 138, angularly directed arm portions 140 and 142, and radially directed end portions 144 and 146. The torque bars 134 and 136 are disposed at right angles to each other and the radially extending end portions 144 and 146 are disposed within bushing members, indicated generally at 148, disposed within radial bores 150 formed in compensating ring 132. Each bushing 148 consists of an outer metal shell 152, an inner metal shell 154, and an intermediate rubber annulus 156 which is secured between shells 152 and 154. A key 158 disposed within a keyway 160 formed in ring 132 and a forwardly tapered keyway 162 formed in the outer shell 152 of bushing 148 serves to lock shell 152 to ring 132 against rotative movement. A Woodruff key 164 locks the inner shells 154 of bushings 148 to the torque bars against rotative movement with respect thereto. The inner ends of inner shells 154 abut shoulders 166 formed on the radially extending portions 144 and 146 of the torque bars. The inner shells of bushings 148 are secured against movement outwardly of compensating ring 132 by means comprising counterbores 168 formed within the outer ends of inner shells 154, washers 170 disposed in abutting relation with the inner ends of counterbores 168, threaded spindles 172 formed integral with the torque bars, lock nuts 174 disposed on spindles 172, and cotter pins 176 extending through nuts 174 and spindles 172. The spindles 172, while shown as being integral with the torque bars are preferably made separate therefrom and threaded into the ends of the torque bars. This enables the torque bar ends to be inserted within the ring bores 150, before the bushings 148 are inserted therein, without any necessity of forming the ring 132 of separable parts.

The torque bars 134 and 136 are provided with oppositely directed slots 178 and 180 which communicate with the internally splined shaft openings of the torque bar hub portions 138. When the torque bars are disposed on the splined ends of the inner and outer axle shafts 10 and 20 and adjustably positioned thereon so that the common axis of the king pins 74 crosses the common axis of rotation of shafts 10 and 20 at the geometrical center of the universal joint 14, the torque bars are tightly clamped to their respective shafts by cap screws 182 and nuts 184. A desirable way in which to cause the torque bars and compensating ring to be so adjustably positioned is to rotate and turn the wheels before the torque bars are fixedly clamped in place. During such rotation and turning of the wheels, the universal joint will self adjust itself to the desired position.

It will be appreciated that since the outer and inner shells 152 and 154 of bushings 148 are keyed, respectively, to compensating ring 132 and torque bars 134 and 136 all motion between the compensating ring and torque bars is taken up by the rubber sleeve elements 156 of the bushings. The shock and motion absorbing rubber elements 156 make this particular Cardan type universal joint a very efficient and desirable one in the steering drive axle assembly from the following standpoints: the rubber bushing elements take up such relative movement between the parts of the universal joint as is caused by the normal manufacturing tolerances of the various parts; the rubber elements further take up those relative motions between parts of the joint which are caused by deflections of the supporting parts of the axle assembly in rugged service; the rubber elements serve to absorb shocks imparted to the axle assembly during abrupt acceleration and deceleration of the vehicle and operation of the vehicle's braking system; and the rubber elements absorb the reactive forces normally imparted by a Cardan universal joint during its rotation to the steering mechanism for the axle assembly and the spring suspension system which connects the axle assembly to the vehicle. These latter mentioned reactive motions normally imparted by a Cardan universal joint are particularly noticeable when the vehicle is in a turn. When the subject unversal joint is used in a steering drive axle assembly, these reactive motions are barely noticeable even when the wheels are at a 35° turning angle. A further favorable advantage derived from employment of the bushings 148 is that a universal joint embodying such bushings requires no lubrication. The bushings 148 are commercially available. They are assembled by press fitting a rubber ring into place between the inner and outer metal shells under very high pressures. The rubber ring is thereby deformed into the shape of the rubber annulus 156, which annulus exerts a pressure of approximately 800 lbs. per square inch against the inner and outer shells. It is this pressure alone which prevents relative turning movement between the interfaces of the rubber and the two shells.

In practice the particular bushing being used by me has been found to have an average radial load capacity of 5,000 lbs. and a maximum dynamic load capacity of 10,000 lbs. It has a static load capacity of 2,000 lbs.

In the subject drive assembly, the maximum possible load on the rubber bushings occurs at the maximum turn angle, 35°, with enough power provided to skid the tires. This maximum load is calculated to be approximately 10,000 lbs. on each bushing when each of the two tires is loaded to 7,500 lbs. at the ground. When the drive assembly is at the maximum turn angle, the bushings are operating under their most dynamic conditions, i.e. each bushing is undergoing a 35° displacement (core to outer shell along a central axis) twice during each wheel revolution.

The unexpected strength of this bushing under dynamic load conditions as compared to static load conditions makes this bushing admirably suited for use in the universal joint of this drive assembly, as the maximum possible load on the bushings occurs under dynamic conditions, and such maximum possible load is within the dynamic load capacity of the bushing.

What is claimed is:

A steering drive axle assembly comprising an axle housing, a driver axle having the outer end thereof extending out of said housing, a bearing for said axle carried by said housing and supporting said axle adjacent the outer end thereof, a suspension yoke secured to said housing, wheel hub means having a king pin connection with said yoke, the axis of pivot of said connection being offset from the vertical, a driven axle freely extending through said wheel hub means and supported adjacent its inner end for rotation by bearing means carried by said wheel hub means, a Cardan type universal joint connecting said axles together including a pair of torque bars, one of said bars being fixedly secured to the inner end of said driven axle and the other being fixedly secured to the outer end of said driver axle, said bars having radially directed end portions, a compensating ring having bores into which the end portions of said bars extend, and means forming yieldable connections between said bars and ring comprising annular bushings fitted into said ring bores, said bushings having outer metal shells, inner metal shells and intermediately disposed annular rubber element, first key means for each bushing securing said outer shells to said ring against axial rotative movement with respect to said ring, said first key means further jointly securing said ring against movement longitudinally of said outer shells, second key means for each bushing securing said inner shells to the end portions of said torque bars against axial rotative movement, and means locking said inner shells to said bar end portions to prevent longitudinal movement of said inner shells with respect thereto, said ring being thereby yieldably movably mounted for limited two way movement longitudinally of the ends of said torque bars by means consisting solely of said annular rubber elements.

References Cited in the file of this patent

UNITED STATES PATENTS

| | | |
|---|---|---|
| 963,609 | Mascord | July 5, 1904 |
| 1,768,759 | Harris | July 1, 1930 |
| 1,838,794 | Thiry | Dec. 29, 1931 |
| 1,881,326 | Peters | Oct. 4, 1932 |
| 2,075,563 | Alden | Mar. 30, 1937 |
| 2,336,579 | Venditty et al. | Dec. 14, 1943 |
| 2,781,211 | Holmes | Feb. 12, 1957 |

FOREIGN PATENTS

| | | |
|---|---|---|
| 616,486 | Great Britain | Jan. 21, 1949 |